Sept. 26, 1972 A. M. GERBER ET AL 3,694,253
METHOD OF FORMING CAPSULES OF POLYMER COATED
SILVER HALIDE GRAINS
Filed May 19, 1971
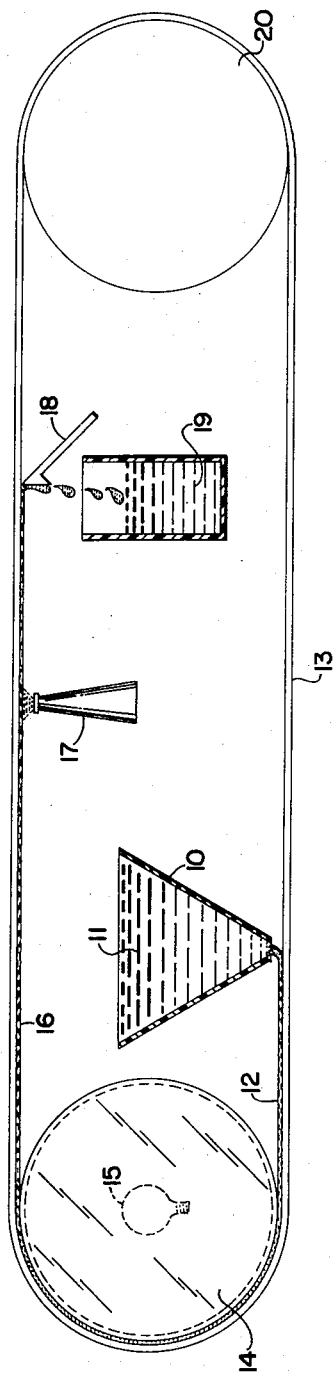
INVENTORS
ARTHUR M. GERBER
and
BY VIVIAN K. WALWORTH
Brown and Mikulka
and
Philip G. Kiely
ATTORNEYS

United States Patent Office 3,694,253
Patented Sept. 26, 1972

---

3,694,253
METHOD OF FORMING CAPSULES OF POLYMER COATED SILVER HALIDE GRAINS
Arthur M. Gerber, Boston, and Vivian K. Walworth, Concord, Mass., assignors to Polaroid Corporation, Cambridge, Mass.
Filed May 19, 1971, Ser. No. 144,754
Int. Cl. B44d 1/50
U.S. Cl. 117—93.31
17 Claims

ABSTRACT OF THE DISCLOSURE

This application is directed to a method for preparing microcapsules comprising a nucleus of silver halide surrounded by a continuous wall of a synthetic polymer, which method comprises forming a relatively thin layer of reactants including monomer and silver halide grains and exposing said thin layer to polymerizing radiation whereby the monomers preferentially polymerize around the silver halide.

BACKGROUND OF THE INVENTION

U.S. application Ser. No. 115,985 filed Feb. 17, 1971, discloses and claims novel microcapsules which comprise a continuous synthetic polymeric layer surrounding a nucleus of photosensitive silver halide. The polymer wall layer is of sufficient thickness and rigidity to prevent the agglomeration or formation of clusters of the silver halide crystals, but sufficiently permeable to permit the ready diffusion therethrough of processing composition. Polymerization is carried out under conditions whereby the silver halide provides the sole catalytic sites. The reactants are employed under relatively dilute conditions. Under the process defined in Ser. No. 115,985, substantially no free polymer is produced in the preparation of the capsules, that is, polymer formation is preferentially associated with the silver halide crystals.

The present invention is directed to an alternative method of making silver halide capsules.

SUMMARY OF THE INVENTION

The present invention is directed to a method of making capsules with a nucleus of photosensitive silver halide which comprises charging to a reaction zone in a relatively thin layer, monomer and silver halide crystals and other optional reactants, and exposing said layer to polymerizing radiation. Selective polymerization of the monomer occurs around the silver halide crystal.

BRIEF DESCRIPTION OF THE DRAWING

The figure is a schematic side elevational view showing one method of preparing the capsules within the scope of the present invention.

DETAILED DESCRIPTION OF THE DRAWING

The present invention is directed to a method of preparing capsules which comprises providing a relatively thin layer of monomer and silver halide and exposing said layer to polymerizing radiation thereby providing selective polymerization around said silver halide crystals. The thus-formed capsules comprise a silver halide nucleus with a continuous polymeric wall surrounding said nucleus of sufficient rigidity and thickness to spatially separate the individual silver halide grains, thus preventing agglomeration of the silver halide and permitting the photographic utility of such capsules as disclosed in Ser. No. 115,985.

While not intending to be bound by any theory, it is believed that the photopolymerization is initiated by the silver halide, as described in the article "Photopolymerization of Acrylamide Initiated by Silver Salts" by G. A. Delzenne, Photographic Science and Engineering, pp. 335–339, Vol. 7, Number 6, November-December 1963. It should be noted, however, that Delzenne is producing bulk polymer.

The silver halides which are particularly useful in the present invention comprise silver chloride, silver chlorobromide, silver bromide, silver iodobromide, silver iodochlorobromide and combinations thereof, which are conventionally employed in photosensitive elements. The silver halides employed in the process of the present invention may be obtained in the form of conventional silver halide emulsions or they may be composed of silver halides in the form of aqueous suspensions and precipitating the silver halides in the absence of a conventional binder material. Thus, in short, silver grains from any suitable source prepared in any conventional method may be employed in the present invention without regard to size or shape.

As stated above, the silver halide employed may be obtained from conventional photographic silver halide emulsions such as gelatin emulsions. If desired, the bulk of the binder material may be removed. However, it is not necessary for the process of the present invention. It should be understood that if the bulk of the binder material is removed, a relatively thin coating of gelatin may surround the silver halide grain over which polymerization occurs. It has been found that the presence of either the relatively thin film or the presence of the bulk gelatin or other binder material exerts little, if any, significant effect on the polymerization of the monomeric material around the silver halide grains.

In order to enhance the polymerization reaction at the surface of the grain, it is preferred to remove excess bromine ion from the polymerizing medium by, for example, treating the silver halide emulsion with an ion exchange resin.

The term "polymer" as used herein is intended to include polymers prepared from single monomers or copolymers prepared from two or more monomers. It should be further understood that the entire thickness of the polymeric layer may be composed of more than a single polymeric entity. Thus, the polymeric layer may be built up to a certain thickness of a single polymer, and then polymerization continued with different monomers to provide the remainder of the wall layer with a polymeric composition different from that of the initial layer. Preferably, the polymer is insoluble in the polymerizing medium, but is prepared from a monomer which is soluble in said medium.

The thickness of the polymeric wall layer is not critical. It is only necessary that the polymeric layer be of sufficient thickness and rigidity to spatially separate and isolate the individual encapsulated silver halide grains from each other to prevent clumping and to permit the uniform distribution of the silver halide in forming a photographic product. Thus, the thickness of the polymeric layer may vary over a relatively wide range. For example, a silver halide grain one micron in diameter, a skin thickness ranging from 0.01 micron to 50 microns, and preferably 0.5 micron, may be employed.

As stated above, the reactants employed in forming the capsules of the present invention are deposited in a relatively thin layer and then subjected to polymerizing radiation. The thickness of the layer may vary over a relatively wide range. The minimum thickness of the layer should be slightly in excess of the desired diameter of the capsules to be formed. The upper limit of thickness on the layer of reactants is determined by the transmission density of the layer with respect to the ability of the incident radiation to penetrate the layer and initiate polymerization. In a preferred embodiment, the thickness of the layer is less than 2 times the proposed thickness of the capsules. In a particularly preferred embodiment, the thickness of the layer may range from 0.2 to 100 microns.

Any suitable substrate or support material may be employed to carry the thin layer of reactants. In one embodiment, a moving transparent belt is employed which carries the layer passed a source of photopolymerizing radiation. Alternatively, the reactants are deposited on a rotating transparent drum which contains a source of photopolymerizing radiation. In the two embodiments denoted above, the capsules are removed from the substrate subsequent to their formation, and are washed and employed in the desired photographic configuration.

In an alternative embodiment, the reactants are deposited on a substrate to which the capsules will adhere, and in this case, no subsequent removal of the capsules from the substrate need occur. Excess reagents and the like are removed by washing.

Turning now to the drawing, the figure shows a cross-sectional elevational view of a process within the scope of the present invention. The reactants 11 including monomer and silver halide are premixed and disposed in hopper 10 from which a uniform thin layer 12 is deposited on moving belt 13 which carries said layer around transparent drum 14 having disposed therein radiation source 15 of a photopolymerizing wavelength. Layer 16 after passing around drum 14 contains silver halide encapsulated in a continuous polymeric wall layer. Station 17 is an optional treatment which includes oxidizing means for the silver halide in the event that the photopolymerizing radiation fogged the silver halide nucleus, i.e., spraying potassium ferricyanide or other suitable oxidizing agent onto the capsules. Doctor blade 18 removes capsules from belt 13 where they are collected in hopper 19. Belt 13 as shown is an endless belt which passed around idler wheel 20 and is then in position to receive more reactants. A washing step (not shown) is also employed to remove any excess starting materials and oxidizing agent.

The polymerizing radiation is selected for its wavelength and is adapted to photopolymerize the given monomer. Such photopolymerization and suitable sources therefor are well known in the art. Generally, for vinyl compounds, any wavelength between about 250 and 700 millimicrons may be employed. It should be understood that the polymerizing radiation may include any radiation capable of forming a latent image in the silver halide grains. In a particularly preferred embodiment, optical sensitizers are disposed in the reactants to provide increased polymerization rates.

The reactants are preferably disposed in a suitable solvent for ease of distribution in the thin layer. The preferred solvent is water.

If desired, various photographic or processing reagents may be incorporated into the capsule, disposing the given reagents in the monomer solution prior to polymerization. Upon formation of the polymer wall around the silver halide crystal, the reagents, will be disposed within the wall. As examples of reagents which may be disposed therein, mention may be made of light filtering dyes, dye precursors, such as color couplers, dye developers, developing agents, mordants, silver halide precipitating agents, antifoggants, and the like. In addition to the entrained dyes, polymeric dyes may also be employed, e.g., dyes containing a vinyl substituent may be copolymerized into the wall.

The following non-limiting example illustrates the novel process of the present invention.

Example

A mixture comprising 9 grams of diacetone acrylamide, 1 gram of acrylamide, 90 cc. of water and 10 cc. of a photosensitive silver iodobromide emulsion (18.4% silver, 3.5% gelatin) having a grain size about 0.8 micron, and 2.0 ml. of an amphoteric surfactant of the formula

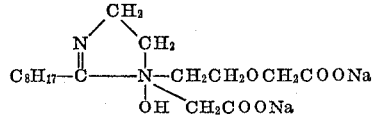

was disposed on a surface in a thickness of about 1.0 micron. The emulsion was pretreated by suspending in 50 g. of emulsion 5 g. of a strong base anion exchange resin (as the hydroxide) (Dowex 21K, The Dow Chemical Company, Midland, Mich.) in a silk bag in the emulsion for 1½ hours. At the end of that time the pBr was >7. The layer was exposed to a light source which emitted light of visible wavelength for about 30 seconds. Upon removal of the unreacted materials by washing with water, capsules 1.6µ in diameter comprising silver bromide, completely surrounded by a continuous polymeric wall, were observed under the optical microscope.

Any suitable monomer capable of polymerization catalyzed by silver halide may be employed in the present invention. Thus, ethylenically unsaturated monomers capable of forming polymers which are permeable to processing composition are suitable for the forming of the walls of the capsules of the present invention. As examples of suitable monomers, mention may be made of acrylamide, diacetone acrylamide, 2-acrylamido-2-methyl-propane sulfonic acid, p-styrene sulfonamide, 1-vinyl chloride, acrylonitrile, styrene, dienes such as butadiene, ethylene and propylene. In an optional embodiment, porosity enhancing materials such as silica and diatomaceous earth may be incorporated into the polymeric layer to provide greater permeability to the capsule wall.

In a preferred embodiment, a monomer or combination of monomers is selected to provide the desired permeability to processing reagents in subsequent photographic employment, but sufficient rigidity to maintain the spacing of the grains.

The polymerizing radiation may result in the reduction of some of the silver halide employed in the formation of the capsules. Thus, it is contemplated that the present invention include the optional step of contacting the thus-formed capsules with a suitable oxidizing agent, such as potassium ferricyanide or other oxidizing agent known to the art. It is preferred, however, that the particular oxidizing agent employed be one which will be readily removed from the capsules as by washing, so that the silver halide will not be again oxidized subsequent to exposure in a photographic system. It should be understood that the oxidizing step is not necessary if the emulsion employed is a direct positive emulsion.

In an alternative embodiment, in order to avoid the necessity of any subsequent oxidation step, a so-called fading latent image emulsion may be employed. In such an emulsion, the latent image in the silver halide fades over a relatively short period of time. Thus, any exposure of the silver halide during the polymerization process will be taken care of by the passage of time and the silver halide will again be available for the recordation of an image. Subsequent processing of the exposed silver halide must be carried out before the latent image fades. However, such processing generally occurs relatively soon after exposure in silver diffusion transfer processes such as those disclosed in Case 4201. The particular life of the latent image may be determined at the option of the operator by the selection of the appropriate silver halide emulsion.

Such fading latent image emulsions are conventional and disclosed in the art, for example, in Photographic Science and Engineering, Vol. 11, Number 3, p. 178–180, May-June 1967.

What is claimed is:

1. A method of forming capsules of polymer coated silver halide grains which comprises forming a mixed layer of a monomer and photosensitive silver halide grains, exposing said layer to a dosage of polymerising radiation sufficient to polymerise only the portion of the monomer within a distance of a grain substantially equal to the desired coating thickness and removing the thus-formed capsules.

2. A method as defined in claim 1 wherein said monomer is a vinyl monomer and said silver halide comprises a gelatin silver halide emulsion.

3. A method as defined in claim 2 wherein said monomer is soluble in the reaction medium and the thus-formed polymer is insoluble in the reaction medium.

4. A method as defined in claim 2 wherein the pBr of said emulsion is greater than 7.

5. A method as defined in claim 1 wherein said radiation has a wavelength between 250 and 700 millimicrons.

6. A method as defined in claim 1 which includes a surfactant and water.

7. A method as defined in claim 1 which includes the step of oxidizing the silver halide subsequent to formation of the capsules.

8. A method as defined in claim 1 wherein said silver halide is optically sensitized.

9. A method as defined in claim 1 wherein said silver halide is chemically sensitized.

10. A method as defined in claim 1 wherein said silver halide is panchromatically sensitized.

11. A method as defined in claim 1 wherein said layer includes a color providing substance.

12. A method as defined in claim 1 wherein said monomer is diacetone acrylamide.

13. A method as defined in claim 1 wherein said monomer is para-styrene sulfonamide.

14. A method as defined in claim 1 wherein said monomer is 1-vinylimidazole.

15. A method as defined in claim 1 wherein said monomer is 2-acrylamide-2-methyl propane sulfonic acid.

16. A method as defined in claim 1 wherein said silver halide is between 0.1 and 10 microns in diameter.

17. A method as defined in claim 16 wherein said silver halide is 1 micron in diameter.

References Cited

UNITED STATES PATENTS

| | | | |
|---|---|---|---|
| 3,322,556 | 5/1967 | Munder et al. | 117—34 |
| 3,386,851 | 6/1968 | Harlan | 117—93.31 |
| 3,518,111 | 6/1970 | Wright et al. | 117—93.31 |
| 3,519,593 | 7/1970 | Bolger | 117—100 B |
| 3,556,795 | 1/1971 | Hughes et al. | 117—34 |
| 3,558,759 | 1/1971 | Sarem | 264—5 |
| 3,639,257 | 2/1972 | Harbort | 117—100 B |

ALFRED L. LEAVITT, Primary Examiner

J. H. NEWSOME, Assistant Examiner

U.S. Cl. X.R.

96—94, 114; 117—34, 100 B; 204—159.11; 264—7, 10